(12) United States Patent
    Seol

(10) Patent No.: US 12,337,807 B2
(45) Date of Patent: Jun. 24, 2025

(54) BRAKE APPARATUS FOR VEHICLE AND CONTROL METHOD THEREFOR

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 384 days.

(21) Appl. No.: 17/862,454

(22) Filed: Jul. 12, 2022

(65) Prior Publication Data

US 2023/0027578 A1    Jan. 26, 2023

(30) Foreign Application Priority Data

Jul. 21, 2021   (KR) .................. 10-2021-0095454

(51) Int. Cl.
    *B60T 13/68*    (2006.01)
    *B60T 8/40*     (2006.01)
    *B60T 7/04*     (2006.01)

(52) U.S. Cl.
    CPC .......... *B60T 13/686* (2013.01); *B60T 8/4081* (2013.01); *B60T 7/042* (2013.01)

(58) Field of Classification Search
    CPC .................................................. B60T 13/142
    See application file for complete search history.

(56) References Cited

U.S. PATENT DOCUMENTS

| | | | |
|---|---|---|---|
| 2005/0151418 A1* | 7/2005 | Bickel ................... | B60T 8/4081 303/122 |
| 2011/0071743 A1* | 3/2011 | Taniguchi ............. | B60T 13/686 701/70 |
| 2016/0214589 A1* | 7/2016 | Seol ....................... | B60T 8/4081 |
| 2020/0108813 A1* | 4/2020 | Kim ....................... | B60T 13/662 |

FOREIGN PATENT DOCUMENTS

DE    102019117655 A1 *   1/2020  ............ B60T 13/142

* cited by examiner

*Primary Examiner* — Melody M Burch
(74) *Attorney, Agent, or Firm* — NovoTechIP International PLLC

(57) ABSTRACT

According to at least one embodiment, the present disclosure provides a method of controlling a brake of a vehicle, the method comprising: a process of determining a pressure difference between channel pressure, which is determined by hydraulic pressure of the wheel brake, and required braking pressure by means of the controller; a process of opening the control valve by means of the controller when the channel pressure is larger than the required braking pressure; and a process of controlling the control valve on the basis of the difference between the required braking pressure and the channel pressure.

9 Claims, 6 Drawing Sheets

BRAKE APPARATUS FOR VEHICLE AND CONTROL METHOD THEREFOR

CROSS-REFERENCE TO RELATED APPLICATIONS

This application claims the benefit of priority to Korean Patent Application Number 10-2021-0095454, filed Jul. 21, 2021, the disclosure of which is incorporated by reference herein in its entirety.

BACKGROUND

1. Technical Field

The present disclosure relates to an automotive braking system and a method of controlling the same. In more detail, the present disclosure relates to an automotive control system that controls residual pressure of a hydraulic pressure generator and a control method thereof.

2. Discussion of Related Art

Description of this section only provides the background information of the present disclosure without configuring the related art.

In an automotive brake system having a hydraulic pressure generator, residual pressure remains in a wheel brake in some cases even though braking pressure is not required for the wheel brake.

For example, in an Electronic Stability Control (ESC) integrated braking system, the braking pressure of a wheel brake is determined on the basis of the rotation speed of a motor that drives a hydraulic pressure generator. When the braking pressure that is required for a wheel brake changes due to variation of pedal pressure that is applied to a brake pedal, etc., the motor drives the hydraulic pressure generator such that the braking pressure of the wheel brake becomes the same as the required braking pressure. When the rotation speed of the motor is higher than a critical speed, the volume per unit time of working fluid that flows to the wheel brake may be larger than the volume, which increases over unit time, of the chamber in the hydraulic pressure generator. In this case, working fluid may flow into the chamber from a reservoir. Accordingly, residual pressure may be generated at the wheel brake.

In order to remove residual pressure that is generated at a wheel brake, when the required braking pressure is smaller than the pressure that is applied to a wheel brake, an automotive braking system of the related art removes residual pressure at the wheel brake by returning a piston of a hydraulic pressure generator to the initial position, controlling the returned piston to maintain displacement of the piston, and opening a valve in a channel communicating with the wheel brake and a reservoir.

FIG. 1 is a graph showing required pressure and channel pressure when residual pressure control is performed by a system and method of controlling a brake of a vehicle of the related art.

Referring to FIG. 1, according to a braking system of the related art, when the braking pressure of a wheel brake that is changed by the position of a piston and flow of fluid is the same as or smaller than the required pressure, it is difficult to make the braking pressure of the wheel brake be the same as the required pressure. Further, when the straight speed of the piston is over a predetermined speed, there may be a problem that the piston generates noise by hitting against an end of a master cylinder and is damaged, if severe.

SUMMARY

According to at least one embodiment, the present disclosure provides a method of controlling a brake of a vehicle including a reservoir storing working fluid, a master cylinder connected with the reservoir, a wheel brake configured to be provided with hydraulic pressure from the master cylinder, a residual pressure control hydraulic line communicating with the reservoir and the wheel brake, a control valve installed in the residual pressure control hydraulic line, an input unit receiving required braking pressure required for the wheel brake, and a controller controlling the degree of opening of the control valve, the method comprising: a process of determining a pressure difference between channel pressure, which is determined by hydraulic pressure of the wheel brake, and required braking pressure by means of the controller; a process of opening the control valve by means of the controller when the channel pressure is larger than the required braking pressure; and a process of controlling the control valve on the basis of the difference between the required braking pressure and the channel pressure.

According to at least one embodiment, the present disclosure provides a system for controlling a brake of a vehicle, the system comprising: a reservoir storing working fluid; a master cylinder connected with the reservoir; a wheel brake configured to be provided with hydraulic pressure from the master cylinder; a residual pressure control hydraulic line communicating with the reservoir and the wheel brake; a control valve installed in the residual pressure control hydraulic line; an input unit receiving required braking pressure required for the wheel brake; and a controller controlling the degree of opening of the control valve, wherein the controller determines a pressure difference between channel pressure, which is determined by hydraulic pressure of the wheel brake, and required braking pressure, opens the control valve when the channel pressure is larger than the required braking pressure, and controls the control valve on the basis of the difference between the required braking pressure and the channel pressure after the process of opening the control valve.

DETAILED DESCRIPTION

Figure 1:
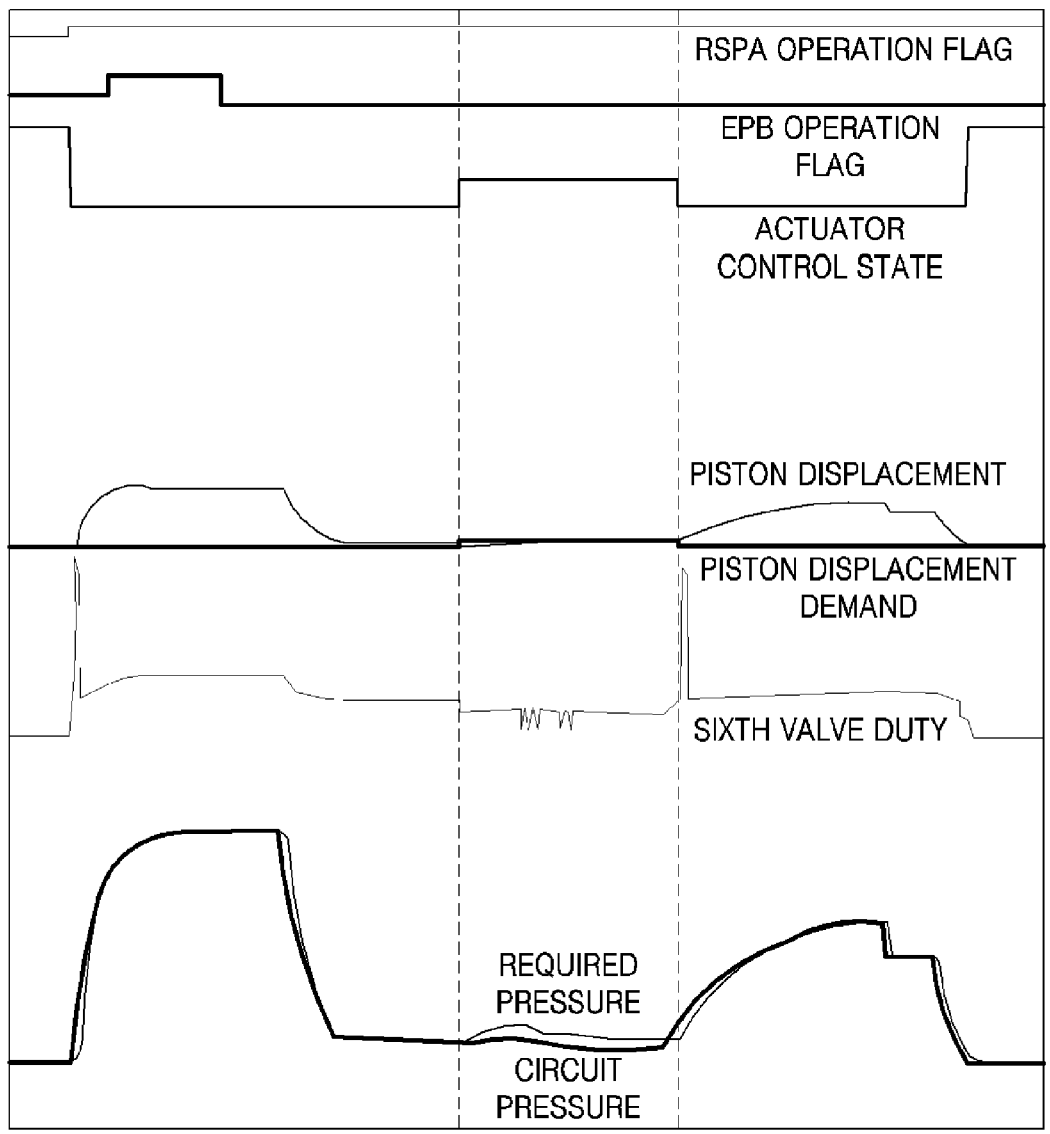
FIG. 1 is a graph showing required pressure and channel pressure over time when residual pressure control is performed by a system and method of controlling a brake of a vehicle of the related art.

Accordingly, a method of controlling a brake of a vehicle according to an embodiment of the present disclosure has been made to solve the problems described above and can keep the braking pressure of a wheel brake to be the same as the required pressure regardless of the large-small relationship of the required pressure and the braking pressure of the wheel brake by opening/closing a control valve installed in a channel connected to a brake and a reservoir by means of a controller.

Further, the method of controlling a brake of a vehicle according to an embodiment of the present disclosure can reduce noise, which is generated by a piston hitting against an end of a master cylinder, and prevent damage to the piston by adjusting a control position of the piston in accordance with the RPM of a motor.

The objects of the present disclosure are not limited to the objects described above and other objects will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

Figure 2:
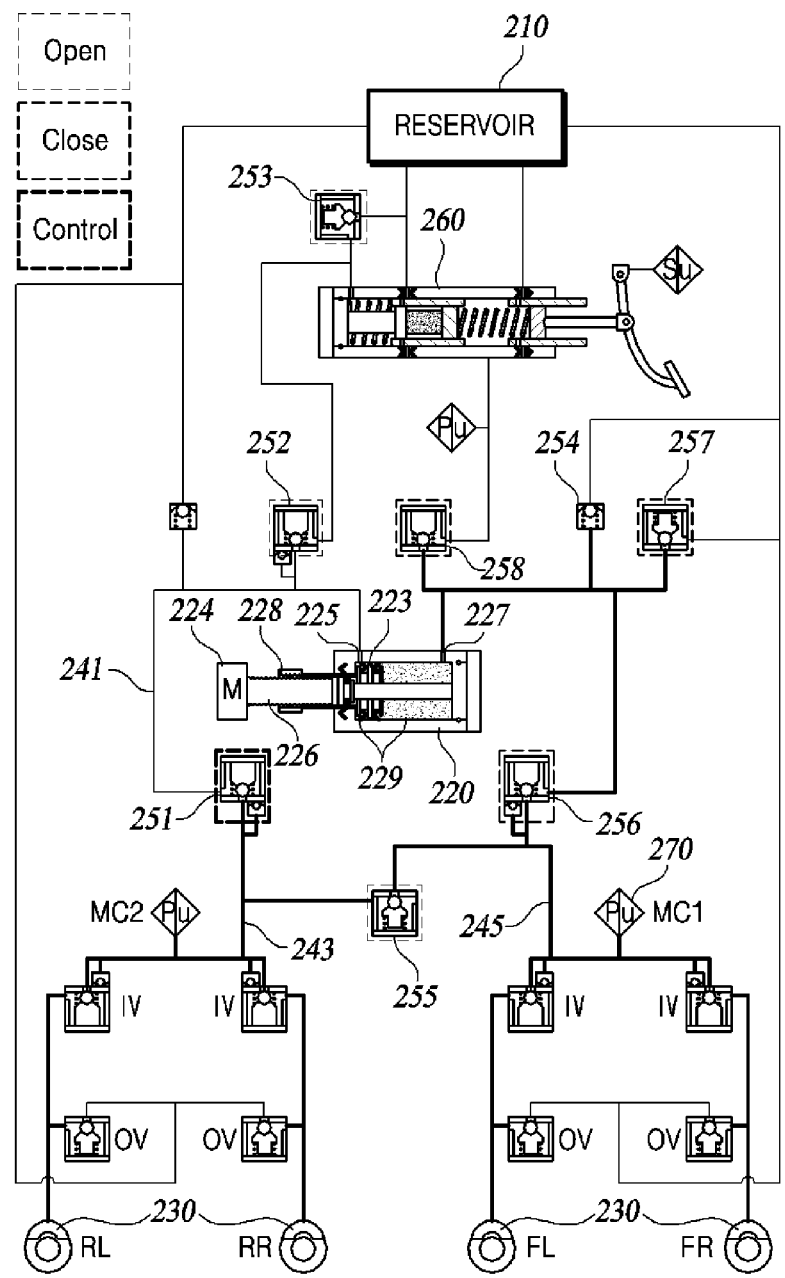
FIG. 2 is a hydraulic circuit diagram showing arrangement on a hydraulic circuit diagram of a system for controlling a brake of a vehicle according to an embodiment of the present disclosure.

Referring to FIG. 2, a system for controlling a brake of a vehicle according to an embodiment of the present disclosure includes some or all of a reservoir 210 that stores working fluid, a master cylinder 220 that is connected with the reservoir 210, a wheel brake 230 that is configured to be provided with hydraulic pressure from the master cylinder 220, a residual pressure control hydraulic line 240 connected to the reservoir 210 and the wheel brake 230, a control valve 251 that is disposed at or installed in the hydraulic line 240, an input unit 260 that receives required braking pressure required for the wheel brake 230, and a controller 300 that controls the degree of opening of the control valve 251.

The reservoir 210 stores working fluid and is in fluid-communication with a cylinder of the wheel brake 230 installed at a wheel, so fluid stored in the reservoir 210 is transmitted to the wheel brake 230 or working fluid is returned from the wheel brake 230. The reservoir 210 may be indirectly connected with the wheel brake 230 through the master cylinder 220, a plurality of valves 250, etc. In general, an outlet valve OV that is closed when a current is not applied and an inlet valve IV that is open when a current is not applied are disposed at each wheel brake 230. When the wheel brake 230 is pressed, working fluid is transmitted to the wheel brake 230 from the reservoir 210 through the inlet valve IV, so the braking pressure of the wheel brake 230 is increased. When the wheel brake 230 is decompressed, the hydraulic pressure of working fluid is transmitted to the reservoir 210 from the wheel brake 230 through the outlet valve OV, so the braking pressure of the wheel brake 230 is decreased.

The master cylinder 220 generates hydraulic pressure for transmitting working fluid to the wheel brake 230 on the basis of braking request signal that is input by a brake pedal, etc. A pedal simulator that can recognize an intention to operate a pedal by a driver and the amount of stroke of a pedal can generate the braking request signal.

A motor 224 is installed at a longitudinal side of the master cylinder 220 according to an embodiment of the present disclosure. Torque of the motor 224 may be used to move a piston 223 straightly in the master cylinder 220 through a spindle 226, which is coupled to the shaft of the motor 224 and rotated with the motor 224, and a fixing nut 228, which is fastened to the spindle 226. The piston 224 generates hydraulic pressure in a channel 229 in the master cylinder 220 while moving straightly in the master cylinder 220.

Discharge ports 225 and 227 connected with at least one wheel brake 230 are formed at the master cylinder 220. The discharge ports 225 and 227 connected to the cylinder of the wheel brake 230 through a channel. The inlet valve IV described above may be installed in the channel connecting the discharge ports 225 and 227 and the master cylinder 220. The volumes of both chambers 229 formed in the master cylinder 220 and separated by the piston 223 are changed by movement of the piston 223. As the volume of each chamber 229 changes, the hydraulic pressure in each chamber 229 increases or decreases.

The piston 223 of the master cylinder 220 according to an embodiment of the present disclosure is configured to be able to generate hydraulic pressure at the wheel brake 230 when the piston 230 moves both forward and backward. That is, the piston 223 is configured to transmit hydraulic pressure to the wheel brake 230 both when moving toward the motor 224 and when moving away from the motor 224. For example, the two discharge ports 225 and 227 connected to the wheel brake 230 may be formed at both ends of the master cylinder 220. Hereafter, the discharge port 225, 227 at the motor 224 is referred to as a first discharge port 225 and the other discharge port 225, 227 is referred to as a second discharge port 227.

A check valve 254 for preventing working fluid from flowing backward to the reservoir 210 from the master cylinder 220 may be installed in the channel-communication with the master cylinder 220 and the reservoir 210.

The wheel brake 230 restricts rotation of a wheel disc by being provided with hydraulic pressure from the master cylinder 220. In the present disclosure, the wheel brake 230, which is driven by the pressure of a working fluid, may be caliper type brake, a drum type brake, or the like. The wheel brake 230 is connected to the reservoir 210 through the outlet valve OV and to the master cylinder 220 through the inlet valve IV. A hydraulic circuit connected with the two discharge ports 225 and 227 formed at the master cylinder 220 may be formed such that working fluid separately discharged from the discharge ports 225 and 227 brakes two wheels, respectively.

The system for controlling a brake of a vehicle shown in FIG. 2 is a H-split type that simultaneously controls a front left wheel FL and a front right wheel FR and simultaneously controls a rear left wheel RL and a rear right wheel RR, but the present disclosure is not necessarily limited thereto and the structure for distributing hydraulic pressure may be freely changed in design. Hereafter, the channel connecting the first discharge port 225, the rear left wheel, and the rear right wheel is referred to as a first hydraulic line 243. Hereafter, the channel connecting the second discharge port 227, the front left wheel, and the front right wheel is referred to as a second hydraulic line 245. In the system for controlling a brake of a vehicle according to an embodiment of the present disclosure, a mixing valve 255 that distributes hydraulic pressure between the first hydraulic line and the second hydraulic line 245 is installed. The same hydraulic pressure can be transmitted to a plurality of wheel brakes 230 installed on wheels by the mixing valve 255 regardless of the movement direction of the piston 223.

The motor 224 is rotated in response to a braking request signal and the piston 223 generates hydraulic pressure in the master cylinder 220 by torque from the motor 224. The generated hydraulic pressure is transmitted to each wheel brake 230 through the hydraulic circuit. The braking pressure that is transmitted to each wheel brake 230 may be changed by the inlet valve IV and the outlet valve OV installed at the wheel brakes 230. The inlet valve IV and the outlet valve OV are solenoid valves 250 and whether the valves are opened/closed is determined in accordance with whether a current is applied.

The hydraulic line 240 is a portion of the hydraulic circuit connecting components of the braking system of the present disclosure. The hydraulic circuit may be divided into several hydraulic lines 240. A plurality of valves 250 are installed in the hydraulic circuit.

The residual pressure control hydraulic line 241 communicates with or is connected to the reservoir 210 and the wheel brake 230. The term 'communicate' includes a situation in which working fluid flows through another component such as a valve 250 or an assistant master cylinder 220 as long as the working fluid can be transmitted between the reservoir 210 and the wheel brake 230. Further, the wheel brake 230, which means the side of the wheel brake 230, includes all channels having pressure the same as or generally the same as the wheel brake 230. It is possible to decrease remaining residual pressure using the residual pressure control hydraulic line 241 even though the outlet valve OV is opened. Further, it is possible to make a channel shorter than a channel for decreasing the pressure of the wheel brake 230 through the outlet valve OV, so it is possible to increase a residual pressure control response speed.

The residual pressure control hydraulic line 241 according to an embodiment of the present disclosure is connected to the reservoir 210 sequentially through a control valve 250, a second valve 252, and a first valve 253 from the first hydraulic line 243, but the system for controlling a brake of a vehicle of the present disclosure is not limited thereto. The residual pressure control hydraulic line 240 may be changed in other ways as long as it is a hydraulic line 240 connected to the reservoir 210 and the wheel brake 230.

A control valve 251 is installed in the residual pressure control hydraulic line 241. Whether the control valve 251 is opened/closed may be determined based on or on the basis of whether a current is applied, and may be configured such that the degree of opening is determined in accordance with the amount of an applied current. When the control valve 251 is opened, working fluid that generates residual pressure at the wheel brake 230 can be transmitted to the reservoir 210 through the wheel brake 230. On the contrary, when the control valve 251 is closed, the hydraulic pressure at the wheel brake 230 is not transmitted to the reservoir 210 through the residual pressure control hydraulic line 241.

Referring to FIG. 2, the system for controlling a brake of a vehicle according to an embodiment of the present disclosure closes valves 256, 257, and 258 between the second hydraulic line 245 disposed far from the control valve 251 and the reservoir while channel pressure is controlled by the control valve 251. This is for transmitting hydraulic pressure well to the residual pressure control line.

The system for controlling a brake of a vehicle according to an embodiment of the present disclosure may open and close the control valve 251 while controlling residual pressure of the wheel brake 230. The control valve 251 makes it possible to more precisely control residual pressure in comparison to the system for controlling a brake of a vehicle which only opens the control valve 251 while controlling residual pressure in the related art.

The control valve 251 according to an embodiment of the present disclosure can adjust the degree of opening of the control valve 251 while the residual pressure of the control valve 251 is controlled. Accordingly, it is possible to more precisely control residual pressure in comparison to the system for controlling a brake of a vehicle which only opens the control valve 251 while controlling residual pressure in the related art.

Figure 3:
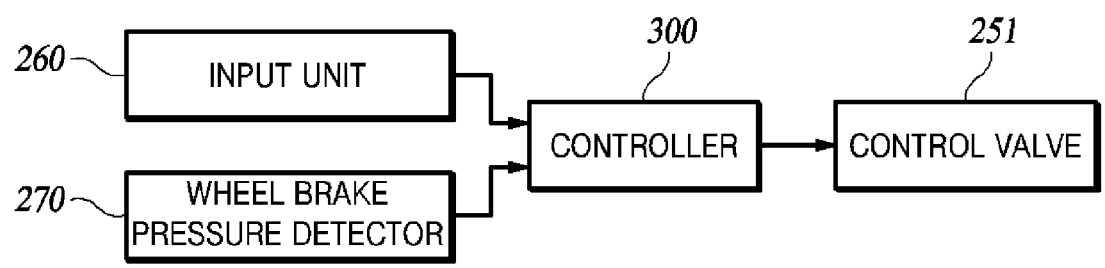
FIG. 3 is a block diagram showing the configuration of a system for controlling a brake of a vehicle according to an embodiment of the present disclosure.

Referring to FIGS. 2 and 3, the input unit 260 generates required braking pressure that is required from the wheel brake 230. The input unit 260 may be a pedal simulator that can recognize an intention to operate a brake by a driver, that is, the required braking pressure. The required braking pressure may be expressed as an electrical signal, but the present disclosure is not limited thereto, and the required braking pressure may be hydraulic pressure generated by a booster that increases pedal pressure by a driver. In another embodiment, the required braking pressure may be a value calculated by at least one module included in an autonomous vehicle and the kind of the required braking pressure is not limited to the embodiment of the present disclosure. The input unit transmits the generated required braking pressure to the controller.

The controller 300 receives the required braking pressure from the input unit 260. The controller 300 controls the degree of opening of the control valve 251. The degree of opening includes not only the opening/closing ratio of the valve 250, but whether to open or close the valve 250. The controller 300, which means a device that functionally controls the valve 250, is not limited to a part physically separated from other components of the automotive braking system of the present disclosure. Further, the controller 300 may be an electronic control unit installed in an Electronic Stability Control (ESC) module.

The controller 300 determines a pressure difference between channel pressure determined by the hydraulic pressure of the wheel brake 230 and the required braking pressure. When the channel pressure is larger than the required braking pressure, the controller 300 opens the control valve 251. The channel pressure is a value that is generally the same as the hydraulic pressure of the wheel brake 230 or a value that is determined on the basis of the hydraulic pressure of the wheel brake 230. The system for controlling a brake of a vehicle according to another embodiment of the present disclosure includes a wheel brake pressure detector 270 for detecting channel pressure. Thereafter, the control valve 251 is controlled on the basis of the difference between the required braking pressure and the channel pressure. A system for controlling a brake of a vehicle of the related art closes the control valve 251 when finishing control without adjusting the degree of opening of the control valve 251 after starting residual pressure control and initially opening the control valve 251. However, the system for controlling a brake of a vehicle of the present disclosure can continuously track the difference between channel pressure, which is determined by the hydraulic pressure of the wheel brake 230, and required braking pressure while controlling the residual pressure of the wheel brake 230. Accordingly, it is possible to continuously reduce the difference between the required pressure and the channel pressure.

In detail, when the channel pressure is larger than the required braking pressure, the controller 300 according to an embodiment of the present disclosure increases the degree of opening of the control valve 251. The controller 300 decreases the degree of opening of the control valve 251 when the channel pressure is smaller than the required braking pressure. Accordingly, even if the large-small relationship between the channel pressure and the required braking pressure changes, it is possible to keep decreasing the difference between the channel pressure and the required braking pressure.

The controller 300 according to an embodiment of the present disclosure increases the degree of opening of the control valve 251 when the magnitude of pressure obtained by subtracting the required braking pressure from the channel pressure meets a first predetermined condition (e.g., being larger than a first critical value), and decreases the degree of opening of the control valve 251 when the magnitude pressure obtained by subtracting the channel pressure from the required braking pressure meets a second predetermined condition (e.g., being large than a second critical value). The first critical value or the second critical value may be a table value obtained through an experiment considering the opening/closing speed of the valve 250, etc. However, the present disclosure is not limited thereto and includes various embodiments such as a value that is calculated in real time through a function by means of the controller 300. Further, the first critical value or the second critical value may be the same value.

A method of controlling a brake of a vehicle of the present disclosure may be achieved by the system for controlling a brake of a vehicle described above.

A method of controlling a brake of a vehicle of the present disclosure includes a reservoir 210 that stores working fluid, a master cylinder 200 that is connected with the reservoir 210, a wheel brake 230 that is configured to be provided with hydraulic pressure from the master cylinder 220, a residual pressure control hydraulic line 241 connected to the reservoir 210 and the wheel brake 230, a control valve 251 that is installed in the residual pressure control hydraulic line 241, an input unit 260 that receives required braking pressure required for the wheel brake 230, and a controller 300 that controls the degree of opening of the control valve 251.

Figure 4:
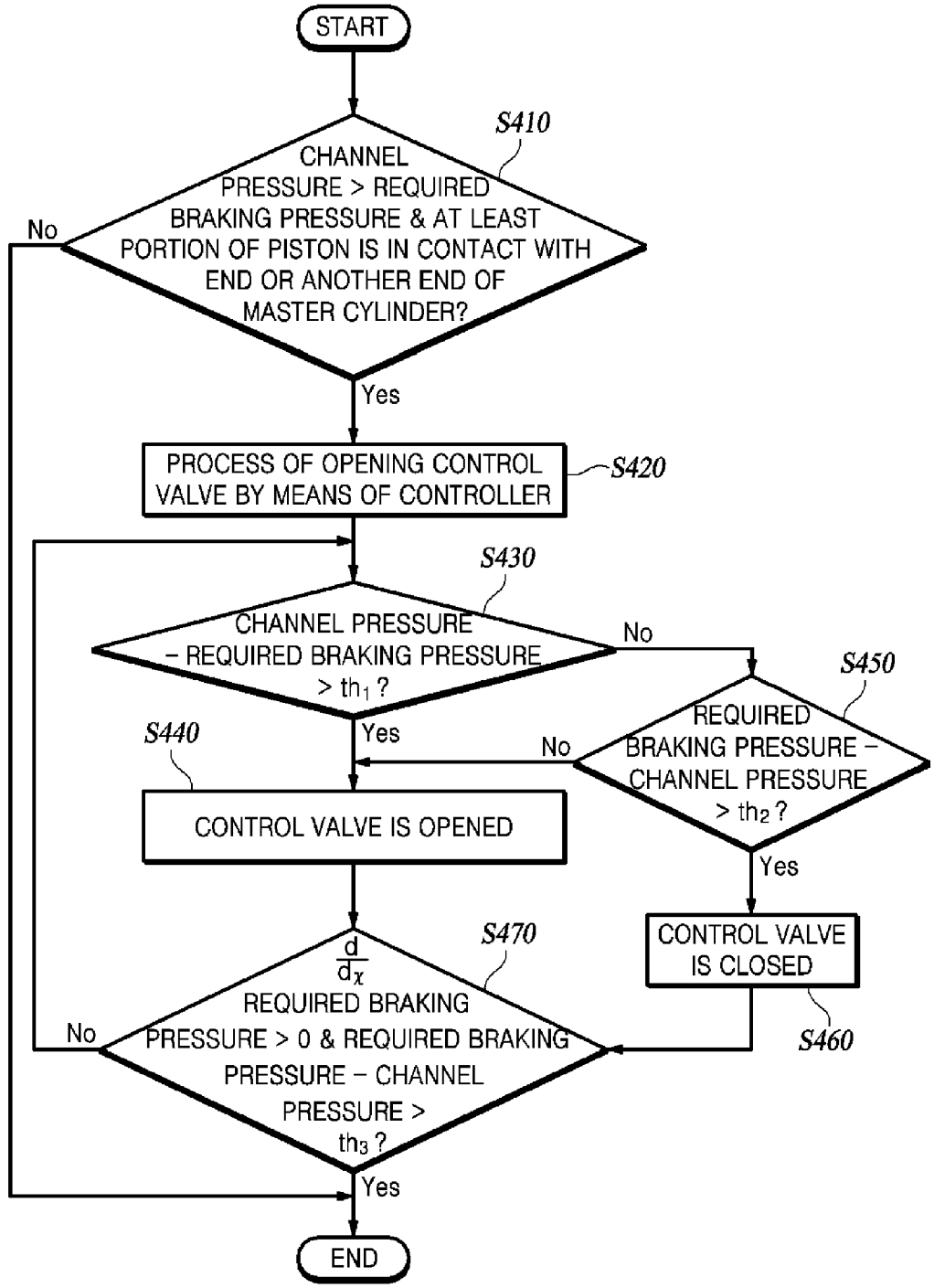
FIG. 4 is a flowchart showing a method of controlling a brake of a vehicle according to an embodiment of the present disclosure.
Figure 5:
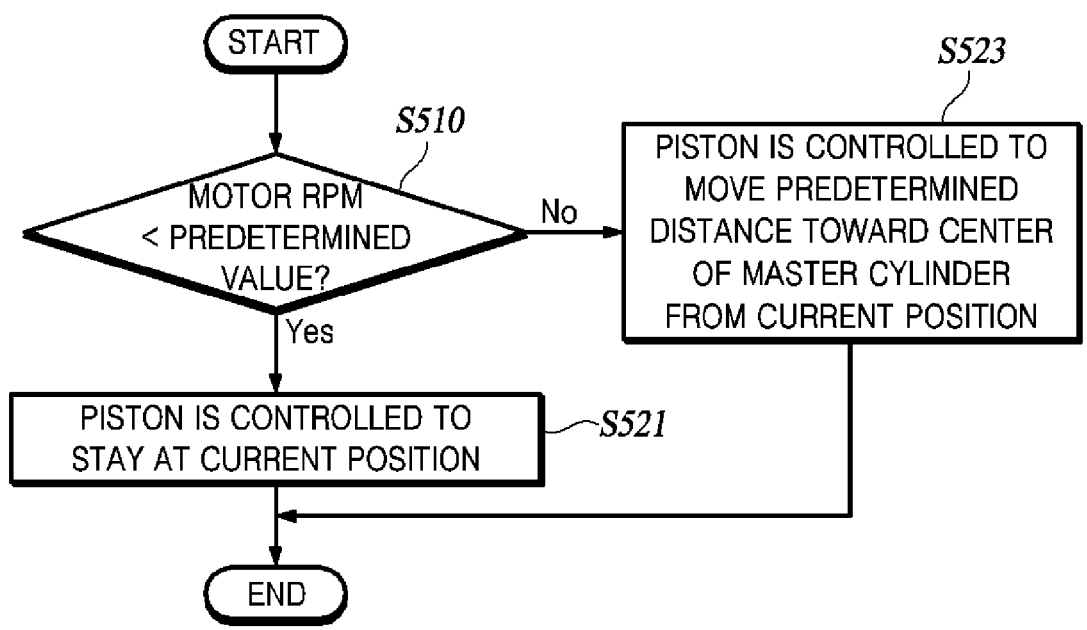
FIG. 5 is a flowchart showing a method of controlling a brake of a vehicle according to another embodiment of the present disclosure.

Referring to FIG. 4, the method of controlling a brake of a vehicle of the present disclosure includes some or all of: a process of determining a pressure difference between channel pressure, which is determined by hydraulic pressure of the wheel brake 230, and required braking pressure by means of the controller 300 and of determining whether at least a portion of a piston 223 in the master cylinder 220 comes on contact with an end or another end in the master cylinder 220 (S410); a process of opening the control valve 251 by means of the controller 300 when the channel pressure is larger than the required braking pressure (S420); a process of comparing the magnitude of first pressure obtained by subtracting the required braking pressure from the channel pressure with the magnitude of a first critical value (S430); a process of increasing the degree of opening of the control valve 251 when the first pressure is larger than the first critical value (S440); a process of comparing the magnitude of second pressure obtained by subtracting the channel pressure from the required braking pressure with the magnitude of a second critical value (S450); a process of decreasing the degree of opening of the control valve 251 when the second pressure is larger than the second critical value (S460); and a process of determining whether a value obtained by subtracting the channel pressure from the required braking pressure that increases over time is a third critical value or more (S470).

In the process S410, the channel pressure is a value that is the same as the pressure of the wheel brake 230 or a value that is determined on the basis of the pressure of the wheel brake 230. The controller 300 determines that residual pressure is generated at the wheel brake 230 when the channel pressure is higher than the required braking pressure and at least a portion of the piston 223 is in contact with an end or another end of the master cylinder 220. The fact that at least a portion of the piston 223 is in contact with an end or another end of the master cylinder 220 means that the displacement of the piston 223 is 0 when the displacement of the piston 223 at a cross-section facing the motor 224 of the master cylinder 220 or at the opposite cross-section is 0.

In the process S420, the controller 300 opens the control valve 251 when it is determined that residual pressure is generated. The control valve 251 may be positioned in a hydraulic line 240 connected to the reservoir 210 from the wheel brake 230. When the control valve 251 is opened, the hydraulic pressure of the wheel brake 230 is transmitted to the reservoir 210 and the residual pressure of the wheel brake 230 decreases.

Referring to FIGS. 2 and 3, the hydraulic pressure of working fluid can be transmitted to the reservoir 210 sequentially through the control valve 251, the second valve 252, and the first valve 253 from the wheel brake 230 in the residual pressure control process. However, the system for controlling a brake of a vehicle of the present disclosure is not limited thereto. The residual pressure control hydraulic line 241 may be implemented in other various ways as long as it is a hydraulic line 240 connected to the reservoir 210 and the wheel brake 230.

After the process S420, a process of controlling the control valve 251 on the basis of the difference between the required braking pressure and the channel pressure is performed. The channel pressure is a value that is the same as the pressure of the wheel brake 230 or a value that is determined on the basis of the pressure of the wheel brake 230. When controlling residual pressure, a system for controlling a brake of a vehicle of the related art closes the control valve 251 when finishing control without adjusting the degree of opening of the control valve 251 after starting control and initially opening the control valve 251. However, the system for controlling a brake of a vehicle of the present disclosure can continuously track the difference between the channel pressure, which is determined by the hydraulic pressure of the wheel brake 230, and the required braking pressure while controlling the residual pressure of the wheel brake 230. Accordingly, it is possible to continuously reduce the difference between the required pressure and the channel pressure.

For example, the method of controlling a brake of a vehicle according to an embodiment of the present disclosure performs the process S430 to the process S460. When the channel pressure is larger than the required braking pressure by a first critical value or more after the controller 300 opens the control valve 251, the residual pressure is decreased by keeping the valve 250 open. However, when the required braking pressure is larger than the channel pressure by a second critical value or more, working fluid is prevented from being transmitted to the reservoir 210 from the wheel brake 230 by closing the control valve 251. The first critical value and the second critical value are 0 or positive values. Thereafter, the required braking pressure increases over time and whether a value obtained by subtracting the channel pressure from the required braking pressure is a third critical value or more is determined (S470), and control is ended when this condition is satisfied, and the method returns to the process S430 and repeats the processes when the condition is not satisfied. The third critical value may be a value that is the same as the second critical value.

The automotive braking system according to an embodiment of the present disclosure includes a step of determining whether the revolutions per minute (RPM) of the motor 224 is a predetermined value or less (S510) and a process of controlling the position of the piston 223 of the master cylinder 220 by means of the controller 300 (S520).

The process of controlling the position of the piston 223 according to an embodiment of the present disclosure controls the position of the piston 223 on the basis of the rotation speed of the motor 224 that drives the piston 223. The rotation speed of the motor 224 may be replaced with a value that shows or can calculate the straight speed of the piston 223 such as the straight speed of the piston 223 or the amount of a current that is applied to the motor 224.

An automotive braking system of the related art controls the piston 223 to be positioned at an end of the master cylinder 220 without considering a straight motion of the piston 223 when controlling the residual pressure. However, a method of controlling a brake of a vehicle in the related art does not consider the speed of the piston 223 approaching an end of the master cylinder 220, so there is a problem in that when the speed of the piston 223 approaching an end of the master cylinder 220 is high, the piston 223 generates noise or is damaged by hitting against the master cylinder 220. However, the method of controlling a brake of a vehicle according to an embodiment of the present disclosure controls the piston 223 to move a predetermined distance toward the center of the master cylinder from the current position when the speed of the motor 224 is predetermined RPM or more, that is, when the piston 223 approaches an end of the master cylinder 220 at a predetermined speed or more (S523). Accordingly, the piston 223 is prevented from generating noise or from being damaged while hitting against the inner wall of the master cylinder 220. Further, when the RPM of the motor 224 is a predetermined value or less, the piston 223 is controlled to stay at the current position (S521).

FIG. 1 is a graph showing required pressure and channel pressure over time when residual pressure control is performed by a system and method of controlling a brake of a vehicle of the related art.

Figure 6:
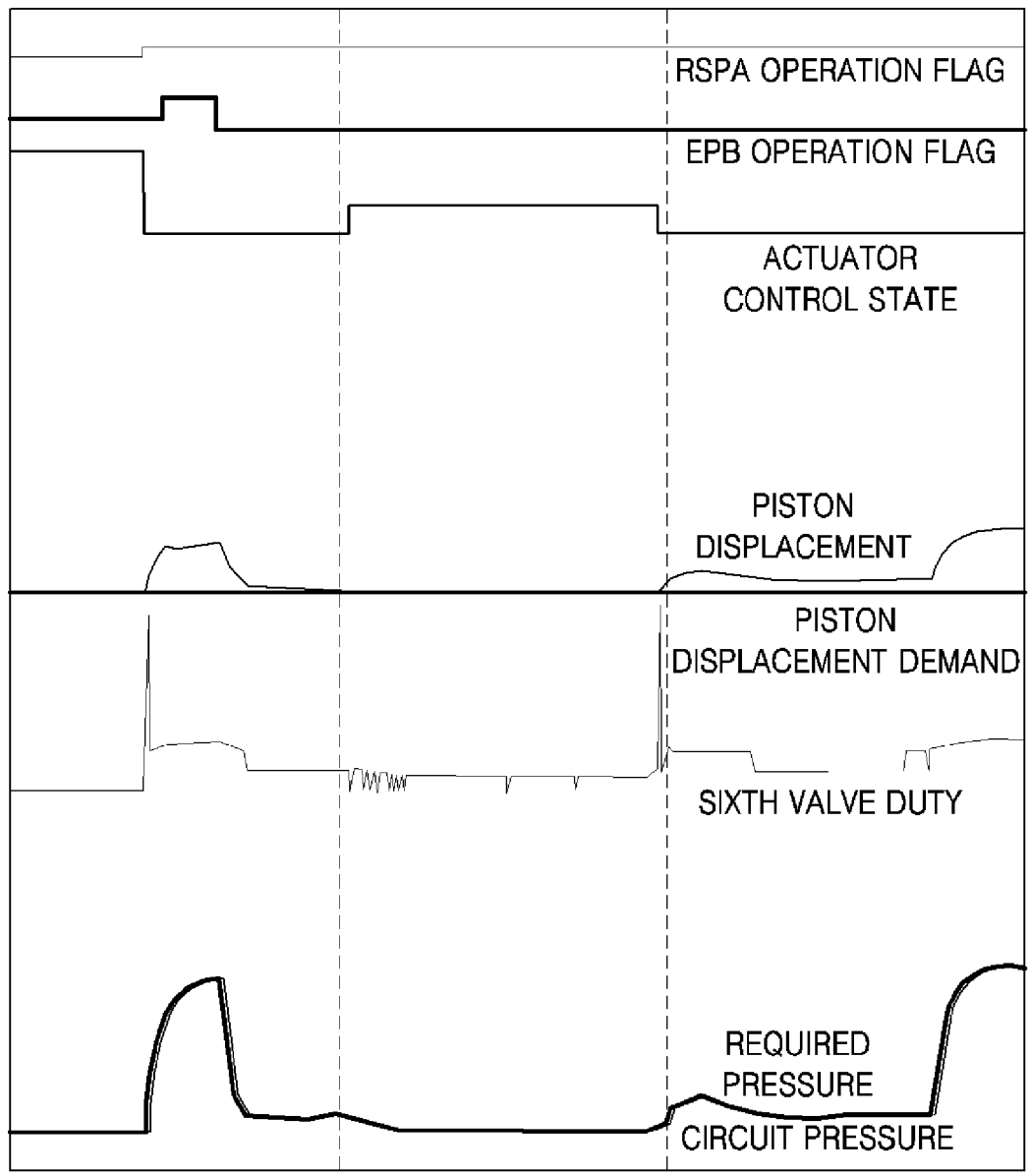
FIG. 6 is a graph showing required pressure and channel pressure over time when residual pressure control is performed by a system and method of controlling a brake of a vehicle according to an embodiment of the present disclosure.

FIG. 6 is a graph showing required pressure and channel pressure over time when residual pressure control is performed by a system and method of controlling a brake of a vehicle according to an embodiment of the present disclosure.

Comparing FIGS. 1 to 6, it can be seen that it is possible to perform more precise control by fitting the channel pressure to the required pressure through the system and method of controlling a brake of a vehicle of the present disclosure in comparison a system and method of controlling a brake of a vehicle of the related art.

Accordingly, a method of controlling a brake of a vehicle according to an embodiment of the present disclosure has been made to solve the problems described above and can keep the braking pressure of a wheel brake to be the same as the required pressure regardless of the large-small relationship of the required pressure and the braking pressure of the wheel brake by opening/closing a control valve installed in a channel connecting a brake and a reservoir by means of a controller.

Further, the method of controlling a brake of a vehicle according to an embodiment of the present disclosure can reduce noise, which is generated by a piston hitting against an end of a master cylinder, and prevent damage to the piston by adjusting a control position of the piston in accordance with the RPM of a motor.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method performed by a controller of a brake of a vehicle, the brake including a reservoir storing working fluid, a master cylinder connected to the reservoir and including a piston configured to linearly move between two mutually opposed ends of the master cylinder, a wheel brake provided with a hydraulic pressure from the master cylinder, a residual pressure control hydraulic line connected to the reservoir and the wheel brake, a control valve disposed at the residual pressure control hydraulic line, an input unit receiving a braking pressure required for the wheel brake, and the controller configured to control a degree of opening of the control valve, the method comprising:
determining a pressure difference between (1) a channel pressure determined based on the hydraulic pressure at the wheel brake, and (2) the braking pressure required for the wheel brake;
determining whether the piston at least partially contacts one of the two mutually opposed ends of the master cylinder;
opening the control valve in response to determining that (1) the channel pressure is larger than the required braking pressure and (2) the piston at least partially contacts one of the two mutually opposed ends of the master cylinder; and
controlling the control valve based on a difference between the required braking pressure and the channel pressure,
wherein controlling the control valve further includes:
comparing a first pressure obtained by subtracting the required braking pressure from the channel pressure with a first predetermined value;

comparing a second pressure obtained by subtracting the channel pressure from the required braking pressure with a second predetermined value;

increasing the degree of opening of the control valve in response to the first pressure being larger than the first predetermined value; and decreasing the degree of opening of the control valve in response to the second pressure being larger than the second predetermined value.

2. The method of claim 1, wherein controlling the control valve further includes:

in response to the channel pressure being larger than the required braking pressure increasing the degree of opening of the control valve; and in response to the channel pressure being smaller than the required braking pressure, decreasing the degree of opening of the control valve.

3. The method of claim 1, further comprising controlling a position of the piston within the master cylinder.

4. The method of claim 3, wherein controlling the position of the piston includes controlling the position of the piston based on a rotation speed of a motor that drives the piston.

5. The method of claim 4, wherein controlling the position of the piston includes:

in response to the rotation speed of the motor being equal to or less than a predetermined value, controlling the piston to stay at a current position within the master cylinder; and in response to the rotation speed of the motor being greater than the predetermined value, controlling the piston to move within the master cylinder for a predetermined distance toward a center of the master cylinder from the current position.

6. The method of claim 1, wherein controlling the control valve further includes determining whether the required braking pressure increases over time and a value obtained by subtracting the channel pressure from the required braking pressure is equal to or greater than a predetermined value.

7. A system for controlling a brake of a vehicle, the system comprising:

a reservoir storing working fluid;

a master cylinder connected to the reservoir and including a piston configured to linearly move between two mutually opposed ends of the master cylinder;

a wheel brake provided with a hydraulic pressure from the master cylinder;

a residual pressure control hydraulic line connected to the reservoir and the wheel brake;

a control valve disposed at the residual pressure control hydraulic line;

an input unit receiving a braking pressure required for the wheel brake; and a controller configured to control a degree of opening of the control valve, wherein the controller is configured to:

determine a pressure difference between (1) a channel pressure determined by a hydraulic pressure of the wheel brake, and (2) the braking pressure required for the wheel brake;

determining whether the piston at least partially contacts one of the two mutually opposed ends of the master cylinder;

open the control valve in response to determining that (1) the channel pressure is larger than the required braking pressure and (2) the piston at least partially contacts one of the two mutually opposed ends of the master cylinder; and control the control valve based on the difference between the required braking pressure and the channel pressure after opening the control valve, wherein the controller is further configured to:

increase the degree of opening of the control valve in response to a pressure obtained by subtracting the required braking pressure from the channel pressure being larger than a first predetermined value; and decrease the degree of opening of the control valve in response to a pressure obtained by subtracting the channel pressure from the required braking pressure being larger than a second predetermined value.

8. The system of claim 7, wherein the controller is further configured to:

increase the degree of opening of the control valve in response to the channel pressure being larger than the required braking pressure; and decrease the degree of opening of the control valve in response to the channel pressure being smaller than the required braking pressure.

9. The system of claim 7, wherein:

the master cylinder includes a motor and the piston configured to move within the master cylinder, and the piston is configured to transmit a hydraulic pressure to the wheel brake when moving toward and away from the motor.

* * * * *